United States Patent [19]
Young

[11] Patent Number: 4,830,496
[45] Date of Patent: May 16, 1989

[54] INTERFEROMETER
[75] Inventor: Niels O. Young, Eagle, Id.
[73] Assignee: General Scanning, Inc., Watertown, Mass.
[21] Appl. No.: 146,851
[22] Filed: Jan. 22, 1988
[51] Int. Cl.$^4$ .............................................. G01B 9/02
[52] U.S. Cl. .................................... 356/363; 356/357
[58] Field of Search .............................. 356/357, 363

[56] References Cited
U.S. PATENT DOCUMENTS 2,518,647  8/1950  Teeple et al. .
2,612,074  9/1952  Mirau .
3,348,446  10/1967 Young .
4,329,055  5/1982  Schaefer et al. .
4,654,530  3/1987  Dybwad .

OTHER PUBLICATIONS

"Laser Rotary Encoders," Motion, Jul./Aug. 1986 and Sep./Oct. 1986 (two parts).
"Fast and Accurate Angle Sensing," *Electro-Optical Systems Design*, Sep. 1975.

Primary Examiner—Davis L. Willis
Assistant Examiner—Matthew W. Koren
Attorney, Agent, or Firm—Nutter, McClennen & Fish

[57] ABSTRACT

A reference mirror (50) in an interferometer is fixed in position with respect to a laser (34). A refractive block (40) having parallel upper and lower surfaces is mounted for pivoting about a pivot axis (60) parallel to the reference mirror (40). The refractive block (40) is disposed in the path of the light beam (36) produced by the laser (34), and it includes a partially reflective surface (42) on its lower face that divides the incident beam (36) into two components (44 and 46), which travel along different paths, in which they are reflected from different portions (48 and 54) of the surface of the reference mirror (50) and from different portions (52 and 56) of a reflective surface on the upper face of the refractive block (40). A second partially reflective coating (58) rejoins portions of the two components to form an exit beam (32) in which the radiation from the two beams interferes in accordance with the angle of the refractive block (40). The angle that the exit beam (32) makes with the surface of the reference mirror (50) is independent of the angle of the refractive block (40).

3 Claims, 2 Drawing Sheets

INTERFEROMETER

BACKGROUND OF THE INVENTION

The present invention is directed to the field of interferometry.

Interferometers are widely used in spectrometers and in angle-measuring devices. An interferometer splits a beam into two parts, directs them along different paths, and then recombines them. Because of the different path lengths, the radiation in the two beams is not in general in phase, so interference occurs. In an angle-measuring system the lengths of the different paths are differently affected by the movement to be measured, and the intensity resulting from the interfering recombined light beams varies between a minimum and a maximum within a single-wavelength change in the difference between the two path lengths. By observing the intensity variations in the recombined light beams, therefore, one can detect minute motions.

FIG. 1 depicts a particularly simple interferometer arrangement of the type described in U.S. Pat. No. 3,348,446 to Young. A refractive block 10 provides on one of its faces first and second beam-splitting surfaces 12 and 14. Surface 12 splits an incoming light beam I into two components, represented respectively in FIG. 1 by dotted and dashed lines. A reflective surface 16 on the other face of refractive block 10 receives the dashed-line beam and reflects it, while the other, dotted-line beam is reflected by a mirror 18. Mirror 18 is spaced apart from refractive block 10 by a cylindrical rod 20. Mirror 18 and refractive block 10 are spring loaded so that the cylindrical rod 20 is compressed between them and maintains a separation equal to its diameter. The rod diameter is kept within tolerances tight enough to ensure that the interferometer is in adjustment. When mirror 18 tilts through an angle to be measured, the cylindrical rod 20 rolls and/or slides between its two lines of contact. The Young patent indicated that its teachings could be practiced not only in the arrangement of FIG. 1 but also in an arrangement in which it was the refractive blocks rather than the mirror that tilted. In practice only the moving-mirror version was used, however, since the moving part in the other version would have had a higher moment of inertia, and no countervailing advantage for that version had been identified at that time.

As FIG. 1 illustrates, the dotted- and dashed-line beams are reflected by the mirror 18 and the refractive-block reflective surface 16, respectively, to another refractive-block reflective surface 22 and the mirror 18, respectively, which in turn reflect the beams to the second beam-splitting surface 14, which reunites the beams for interference.

Although the Young arrangement provided a simple spectrometer that was easy to set up and maintain, it did have a drawback. As is stated in lines 67–72 of column 3 of the Young specification, the pivoting of the mirror resulted in some relative shifting of the two components of the recombined beam. This relative movement causes an undesirable reduction in the amount of overlap of the two "recombined" beams. In addition to the relative motion, the Young arrangement resulted in swinging of the recombined beam as a whole. Together, those two effects were annoying and, for some applications, intolerable.

An object of the present invention is to employ the teachings of the Young patent mentioned above without suffering the exit-beam shifting and swinging experienced by prior users of the invention.

SUMMARY OF THE INVENTION

The foregoing and related objects are achieved in an interferometer similar to that of FIG. 1 with the exception that the element corresponding to mirror 18 is the element that is fixed in position while the refractive block 10 is the pivoting element. I have found that, by pivoting the refractive block rather than the mirror, the positions of the exit beams remain stationary throughout the range of operation of the interferometer.

The invention is defined with more particularity in the appended claims.

BRIEF DESCRIPTION OF THE DRAWINGS

These and further features and advantages of the present invention are described in connection with the accompanying drawings, in which.

DETAILED DESCRIPTION OF AN ILLUSTRATIVE EMBODIMENT

Figure 1:
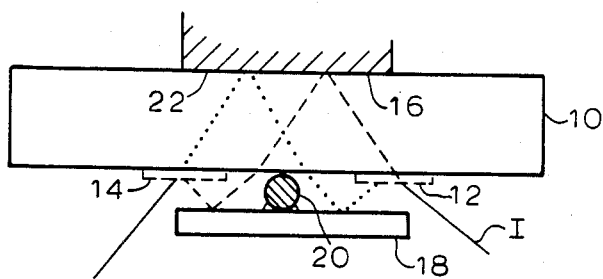
FIG. 1 is a diagram of a prior-art interferometer over which the interferometer of the present invention is an improvement.
Figure 2:
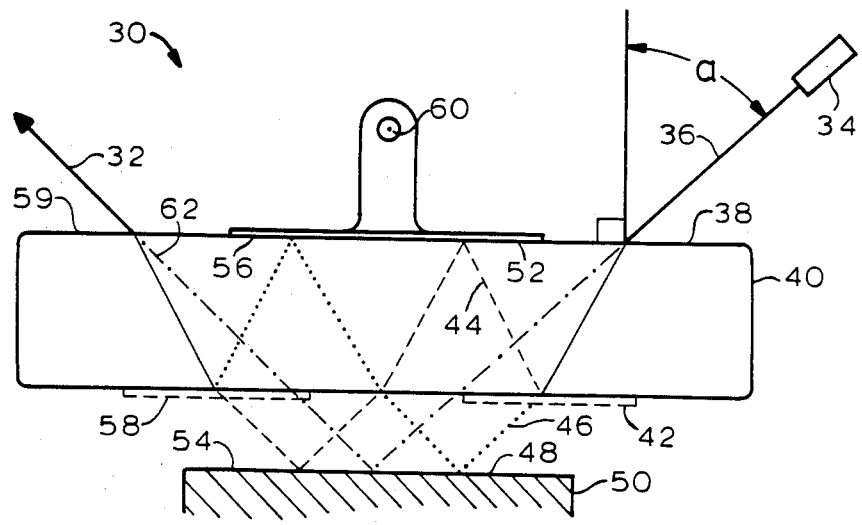
FIG. 2 is a similar diagram of the interferometer of the present invention in its zero-retardation position.

FIG. 2 depicts an interferometer 30 in which, according to the teachings of the present invention, the angle of the exit beam 32 is independent of the tilt angle being measured. A light source such as a laser 34 generates an incident beam 36 and transmits it to an optically flat anti-reflective surface 38 of a block 40 of refractive material, typically glass. The light beam is accordingly bent so that it follows a path in which it reaches a surface 42 on the other face of block 40. Surface 42 is parallel to surface 38 and has a transmissive/reflective (beam-splitting) coating, which splits the incoming beam 36 into two beams 44 and 46 represented by dashed and dotted lines, respectively.

The dotted-line beam is reflected off a first reference reflective surface 48 provided by a fixed-position mirror 50. The dashed-line beam 44, on the other hand, reflects off a first pivot-element reflective surface 52, which is parallel to surface 42. The dashed-line beam then reflects off a second reference reflective surface 54 provided by the mirror 50, while the dotted-line beam reflects off a second pivot-element reflecting surface 56. (Although FIG. 2 depicts coplanar reflective surfaces 48 and 54 as being portions of the same continuous surface and coplanar reflective surfaces 52 and 56 also as portions of a common continuous surface, these surfaces can in principle be provided separately.)

After reflection from reflective surfaces 54 and 56, the two beams are directed to a second beam-splitter surface 58, which is coplanar with surface 42. The second beam splitter surface recombines the two beams, directing them along a common path 32 through an exit surface 59 coplanar with surface 38.

FIG. 2 depicts the zero-retardation position of the interferometer, in which the refractive block 40 is disposed parallel to the reference mirror 50. In accordance with the present invention, it is the mirror 50 that is the stationary element, while refractive block 40 is mounted for pivoting about a pivot axis 60. As a result, there is no relative movement of the two components of exit beam 32, and no absolute movement of the composite beam 32, with motion of the refractive block. The amount of pivoting of block 42 is what is measured by observing the passage of interference fringes in the exit beam 32.

This arrangement is easy to set up; one can adjust the incidence angle and locate the observation point before the refractive block 40 is installed because the angle of the exit beam is the same regardless of whether the refractive block 40 is present; the dot-and-dash line 62 represents the path taken by the beam when block 40 is removed. The fringe count produced by this arrangement is also relatively insensitive to movements other than the tilting that it is the purpose of the interferometer to measure. It is completely insensitive to pure translations of the refractive block 40, and it is also completely insensitive to pivoting of the block around any axis perpendicular to the force of refractive block 40. Pivoting of the block about an axis parallel to the mirror 52 in the plane of incidence and reflection does affect the fringe count, but that effect is very small.

Figure 3:
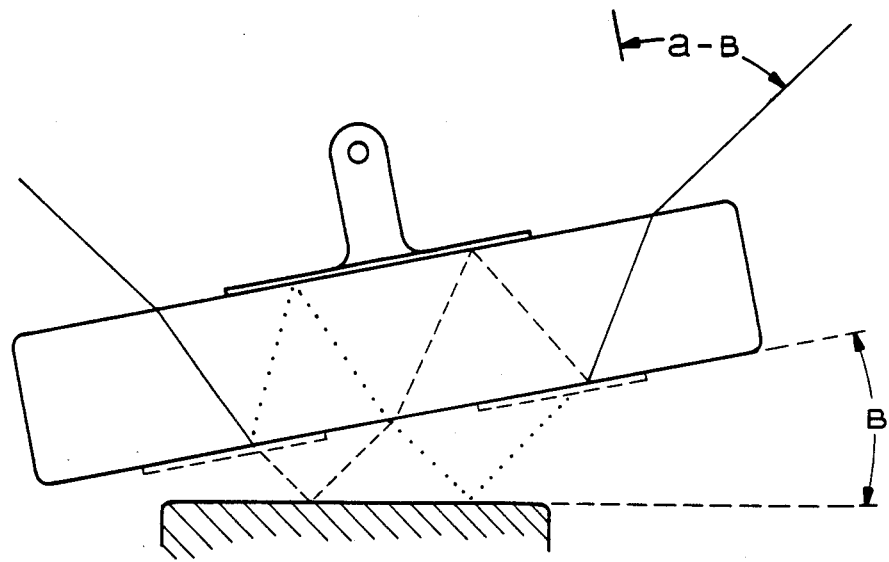
FIG. 3 is a diagram of the same interferometer with the refractive block tilted.

FIG. 3 shows the interferometer of FIG. 2 in a tilted position. By comparing the two figures, it can be appreciated that the dashed-line and dotted-line paths are of the same length in FIG. 2 but of different lengths in FIG. 3. It is this change in path length that results in passage of the interference fringes.

Although the teachings of the present invention can readily be practiced in a wide range of designs, the design depicted in the drawings optimizes certain aspects of interferometer operation by a judicious choice of the block refractive index and of the incidence angle a that the incident beam 36 forms with the normal to the reference mirror 50 where beam 36 first leaves the laser 34, as shown in FIG. 2.

The number of interference fringes that pas as the refractive block 40 pivots between two tilt angles depends on the incidence angle a. This means that the incidence angle must be set with some precision if the angle determined by the fringe count is to be accurate. It also means that it is desirable for the light beam to be narrow; different numbers of interference fringes for a given tilt-angle change will occur in different parts of the beam if it is too wide.

To minimize the variation in numbers of interference fringes for a given beam width and tilt-angle change, I have employed the angle of incidence at which the retardation, or difference between the lengths of the two paths, is a maximum as a function of incidence angle a and thus has a derivative of zero. At this incidence angle, therefore, retardation—and thus number of interference fringes—is least sensitive to changes in incidence angle.

This maximum-retardation incidence angle $a_0$ is a function of the index of refraction N of block 40:

$$a_0 = \arcsin (N^2 - N(N^2-1)^{\frac{1}{2}})^{\frac{1}{2}}$$

For practical indices of refraction N, the values of the angle $a_0$ span a narrow range centered about 49 degrees:

TABLE 1

| $a_0$ | N |
|---|---|
| 48° | 1.7081 |
| 49° | 1.5268 |
| 50° | 1.4082 |

As the refractive block 40 tilts, there is movement of the points at which the light beam and its components hit the various anti-reflective, partially reflective, and fully reflective surfaces on the refractive block 40. The amount of this movement contributes to the necessary size of block 40 because it increases the size that those surfaces must be to prevent them from cutting off the beam. For a given pivot axis, I believe that this movement is minimized by choosing an angle of incidence $a_1$ such that the points at which the two components of the light beam hit mirror 50 are equidistant from the point at which the light beam would hit mirror 50 in the absence of the refractive block 40. This angle is given by the following expression:

$$a_1 = \arcsin ((4-N^2)/3)^{\frac{1}{2}}$$

Simultaneous satisfaction of the constraints imposed by the foregoing two equations can be achieved by making $a_0 = a_1$ and solving the preceding equations for N. When this is done, we find that N=1.5119 and $a_0=49.11°$. To approximate satisfaction of these constraints, I have employed Schott BK-7 glass, which has an index of refraction N=1.5151 at a wavelength of 632.8 nm.

As is apparent, the pivot axis is spaced from the center of gravity of the refractive block 40; i.e., it has not been positioned so as to minimize the moment of inertia of the moving part for a given block size. However, by spacing the pivot point in the indicated manner, the size of the refractive block 40 can be reduced because positioning of the pivot axis as indicated also minimizes the motion of the points at which the light beam and its components hit the anti-reflective, partially reflective, and reflective surfaces on the refractive block 40. It can be shown that minimization of this motion is achieved by providing a pivot axis whose perpendicular distance from the nearest plane surface of refractive block is approximately 0.7 times the thickness of the refractive block when a is approximately 49°.

The retardation P caused by a refractive block 40 of thickness t tilted at angle B is given by the following expression:

$$P = 2t\{[N^2 - \sin^2(a-B)]^{\frac{1}{2}} - [N^2 - \sin^2(a+B)]^{\frac{1}{2}}\}$$

For N=1.5151 and a=49.00°, the following table gives the ratio of the retardation to twice the thickness (P/2t) as a function of tilt angle B. It also gives the deviation D of P/2t from a linear function having zero deviation at B=0 and B=10:

TABLE 2

| B, degrees | P/2t | D |
|---|---|---|
| 0.00 | 0.00 | 0.00 |
| 1.00 | 13.153 × 10$^{-3}$ | .263 × 10$^{-3}$ |
| 2.00 | 26.290 | .510 |
| 3.00 | 39.394 | .725 |
| 4.00 | 52.451 | .892 |
| 5.00 | 65.444 | .995 |
| 6.00 | 78.357 | 1.019 |
| 7.00 | 91.175 | .947 |
| 8.00 | 103.881 | .763 |
| 9.00 | 116.461 | .453 |
| 10.00 | 128.898 | .000 |

This table illustrates that retardation deviates slightly more than 1% from linear. (Actually, the deviation is less than that if one or both of the endpoints are not required to have zero deviation.) The retardation can be fitted to better than one part in 10$^5$ by the following function:

$$P/2t = 0.37690 \sin(2.0010B)$$

It is thus apparent that the foregoing interferometer provides significant advantages over the prior art. By keeping the mirror fixed with respect to the light source, the exit beam is fixed in space. Moreover, unlike the pivot axis of the previous Young arrangement, the pivot axis of the present invention can be fixed in position to provide for more-satisfactory measurement of shaft angles. The present invention thus constitutes a significant advance in the art.

I claim:

1. An interferometer comprising:
   A. a reference reflective element comprising first and second coplanar reference reflective surfaces;
   B. a reference light source, fixed in position with respect to the reference reflective element, for emitting a narrow light beam;
   C. a pivot element including a block of refractive material having first and second parallel faces, first and second coplanar pivot-element reflective surfaces on the first face, and first and second coplanar transmissive/reflective surfaces on the second face, the pivot element being positioned for reception and division of the light beam by the first transmissive/reflective surface into first and second components directed to the first pivot-element and reference reflective surfaces, respectively, and therefrom to the second reference and pivot-element reflective surfaces, respectively, and therefrom to the second transmissive/reflective surface to direct portions of first and second components along a common exit path, the paths of incidence and reflection from the reference reflective surface thereby defining a plane of incidence and reflection, the pivot element being pivotably mounted for pivoting about a pivot axis normal to the plane of incidence and reflection wherein the angles $a_0$ formed with the normals to the first and second coplanar reference reflective surfaces by the light-beam components incident thereon are substantially equal to the value given by the equation $$a_0 = \arcsin[N^2 - N(N^2 - 1)^{\frac{1}{2}}]^{\frac{1}{2}},$$

where N is the index of refraction of the block of refractive material.

2. An interferometer as defined in claim 1 wherein the angles $a_0$ formed with the normals to the first and second coplanar reference reflective surfaces by the light-beam components incident thereon are substantially equal to the value given by the equation $$a_0 = \arcsin[(4 - N^2)/3]^{\frac{1}{2}},$$

where N is the index of refraction of the block of refractive material.

3. An interferometer comprising:
   A. a reference reflective element comprising first and second coplanar reference reflective surfaces;
   B. a reference light source, fixed in position with respect to the reference reflective element, for emitting a narrow light beam;
   C. a pivot element including a block of refractive material having first and second parallel faces, first and second coplanar pivot-element reflective surfaces on the first face, and first and second coplanar transmissive/reflective surfaces on the second face, the pivot element being positioned for reception and division of the light beam by the first transmissive/reflective surface into first and second components directed to the first pivot-element and reference reflective surfaces, respectively, and therefrom to the second reference and pivot-element reflective surfaces, respectively, and therefrom to the second transmissive/reflective surface to direct portions of first and second components along a common exit path, the paths of incidence and reflection from the reference reflective surface thereby defining a plane of incidence and reflection, the pivot element being pivotably mounted for pivoting about a pivot axis normal to the plane of incidence and reflection wherein the angles $a_0$ formed with the normals to the first and second coplanar reference reflective surfaces by the light-beam components incident thereon are substantially equal to the value given by the equation $$a_0 = \arcsin[(4 - N^2)/3]^{\frac{1}{2}},$$

where N is the index of refraction of the block of refractive material.

* * * * *